July 5, 1927.

F. MILLER

POWER TRANSMISSION UNIT

Filed May 18, 1925

1,634,376

INVENTOR
Ferdinand Miller
BY
Joseph N. Schofield
ATTORNEY

Patented July 5, 1927.

1,634,376

UNITED STATES PATENT OFFICE.

FERDINAND MILLER, OF PLAINFIELD, NEW JERSEY, ASSIGNOR TO NILES-BEMENT-POND COMPANY, OF NEW YORK, N. Y., A CORPORATION OF NEW JERSEY.

POWER-TRANSMISSION UNIT.

Application filed May 18, 1925. Serial No. 30,993.

This invention relates to power transmission units and in particular to an improved form of geared speed reducing or increasing mechanism.

An object of the present invention is to provide a compact, efficient transmission unit in which the gear members are symmetrically disposed so that pressures on the bearings will be substantially balanced.

A further object of the invention is to provide means for stiffening some of the shafts carrying the gears against bending or lateral deflection while permitting them to have a maximum desirable torsional displacement.

One feature which enables me to accomplish the above named objects is that sleeves extending substantially the entire length of the intermediate shafts between supporting bearings are provided suitably keyed near one end to these shafts on which are mounted intermediate gears. The sleeves are adapted to closely surround the intermediate shafts so that they are stiffened against lateral deflection or bending. As the sleeves are attached to the shafts at one end only, they do not prevent torsional displacement of the intermediate shafts.

Another feature of advantage is that the shafts of the unit extend parallel to each other in the same plane and the driving and driven shafts are in alinement.

With these and other objects in view, my invention consists in the features of construction and operation set forth in the following specification and illustrated in the accompanying drawing.

In the accompanying drawing annexed hereto and forming a part of this specification, I have shown my invention embodied in a preferred form of geared speed changing mechanism, but it will be understood that the invention can be otherwise embodied and that the drawing is not to be construed as defining or limiting the scope of the invention, the claims appended to this specification being relied upon for that purpose.

In the above mentioned drawing I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a casing; second, a driving shaft; third, one or more intermediate shafts; fourth, a driven shaft; fifth, intermeshing gears on said shafts so that the driven shaft may be rotated positively and at a definite speed relative to the driving shaft; and sixth, sleeves closely surrounding and keyed to the intermediate shafts and extending substantially the full distance between bearings supporting the intermediate shafts and adapted to have intermediate gears keyed to their outside surfaces.

Figure 1:
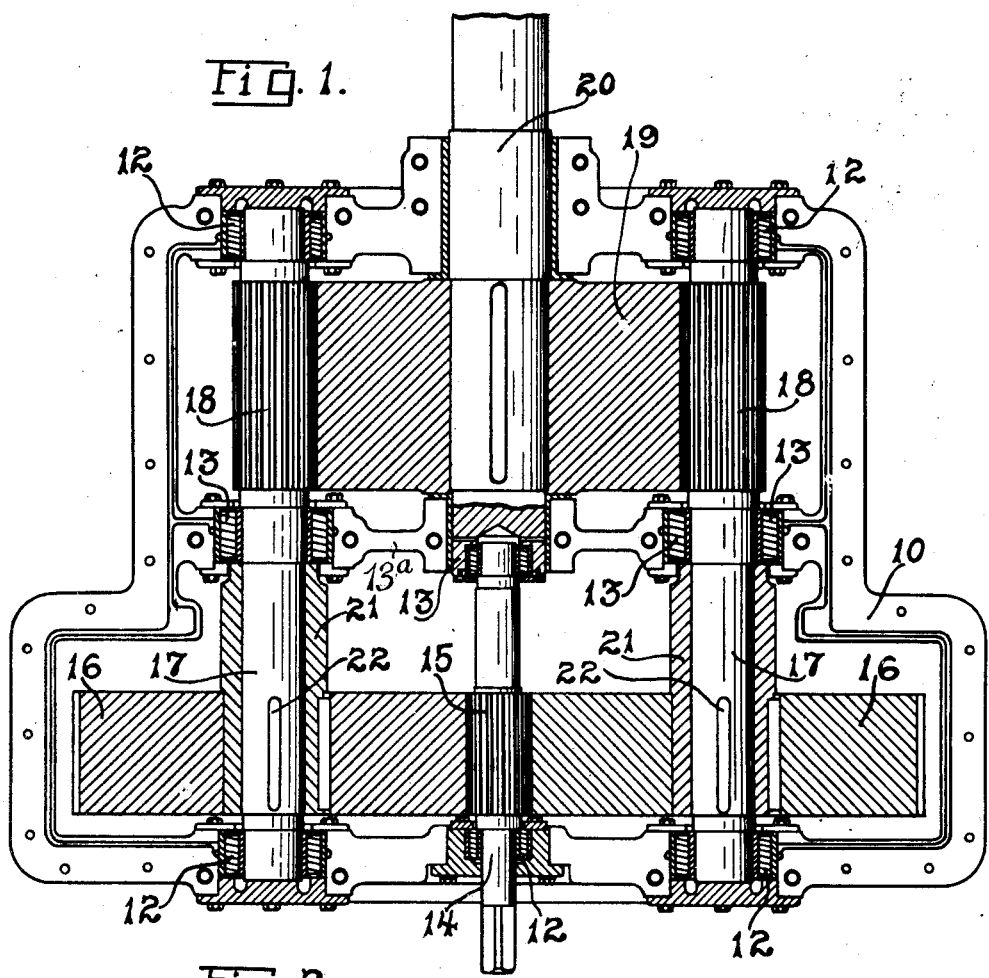
Figure 1 is a plan view of the transmission, the upper casing being removed and showing some of the gears in section.
Figure 2:
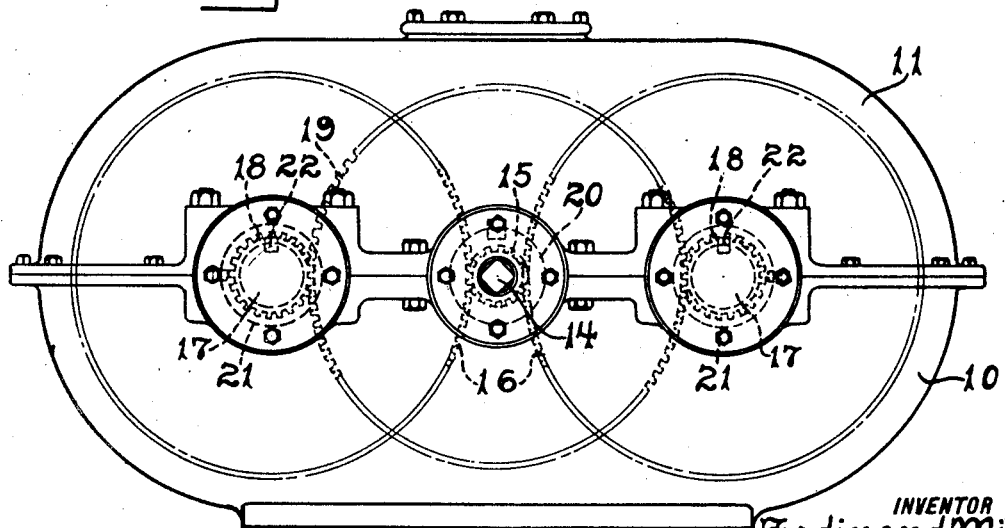
Fig. 2 is an end elevation of the complete mechanism.

Referring more in detail to the figures of the drawing, I provide a lower casing member 10 and an upper casing member 11 having bearings 12 for the rotating shafts. These bearings 12, as shown, are of the roller type and are disposed in parallel relation to each other and preferably in the same plane. Preferably and as shown in Fig. 1, intermediate bearings 13 are provided upon intermediate portions 13ª of the casings 10 and 11 midway between the bearings 12 to aid in properly supporting the shafts forming the operating parts. A driving shaft 14 is provided at an intermediate point with a pinion 15 adapted to intermesh with a plurality of symmetrically disposed intermediate gears 16 on intermediate shafts 17. Pinions 18, preferably formed integrally on these intermediate shafts 17, engage a common gear 19 keyed directly to a driven shaft 20. It will be seen from the above described mechanism that rotation of the driving shaft 14 will rotate the intermediate shafts 17 at reduced speeds and these intermediate shafts 17, in turn, will rotate the driven shaft 20 at a still greater reduced speed.

In all transmission units involving a plurality of shafts and intermediate gears engaging a common gear, inaccuracy of cutting the teeth or in alining the teeth of gears on the same shaft or in assembling the unit may affect the intermeshing relationship between the gears. In order to compensate for this, a certain amount of torsional displacement is preferably desirable in the intermediate shafts between the intermediate gear 16 and a support. This is provided for in the present instance by making the intermediate shafts 17 between the intermediate gears 16 mounted thereon and the intermediate bearings 13 relatively small in diameter. However, a high degree of stiffness against lateral displacement is essential in these intermediate shafts 17 so that they cannot bend and adversely affect the intermeshing relationship between co-acting gears 15 and 16.

In order to effect this stiffness of the intermediate shafts 17 without adversely affecting the torsional qualities desired, sleeves 21 closely surrounding portions of the intermediate shafts 17 are provided keyed thereto as shown in Fig. 1. The intermediate gears 16 are keyed directly to one end of the sleeves 21 so that the remaining portions of the sleeves 21 extend along the intermediate shafts 17 closely surrounding them but not keyed thereto along their entire length. It is therefore possible for the intermediate shafts 17 to deflect torsionally in response to the stresses on the shafts due to the load carried, but due to the sleeves they are prevented from bending. In other words, the effect obtained by the sleeves is to strengthen the intermediate shafts 17 against lateral bending stresses without affecting the torsional qualities for which these shafts are designed.

As shown in Fig. 1, the keys 22 connecting the sleeves 21 to the intermediate shafts 17 extend only as far as the gears 16 are wide. The remaining length of the sleeves 21 which extend the entire distance between the bearings 12 at one end and the bearings 13 on the intermediate web 13ª is unkeyed and therefore permits the shafts 17 to twist due to the torsional stresses. The sleeves 21 however in effect materially increase the section modulus of the shafts and therefore materially increase the resistance to flexure.

What I claim is:

1. A power transmission unit comprising in combination, a casing, a driving shaft, an intermediate shaft, a driven shaft, intermeshing gears on said shafts, and a sleeve keyed at one end to said intermediate shaft and to one of said gears and closely surrounding a portion thereof whereby said shaft is strengthened against bending while permitting maximum torsional displacement.

2. A power transmission unit comprising in combination, a casing, a driving shaft, an intermediate shaft, a driven shaft, intermeshing gears on said shafts, and a sleeve on said intermediate shaft extending between supporting bearings for said shaft and fastened at one end to said intermediate shaft and to one of said gears whereby said shaft is strengthened against bending while permitting maximum torsional displacement.

3. A power transmission unit comprising in combination, a casing, a driving shaft, a driven shaft, intermediate shafts symmetrically disposed relative to said driving and driven shafts, intermeshing gears on said shaft, and sleeves keyed at one end to said intermediate shafts and to said gears and extending substantially the entire length between supporting bearings therefor whereby said intermediate shafts are strengthened against bending while permitting maximum torsional displacement.

4. A power transmission unit comprising in combination, a casing, a driving shaft, a driven shaft, intermediate shafts symmetrically disposed relative to said driving and driven shafts, intermeshing gears on said shaft, and sleeves keyed respectively to one of said intermediate shafts and to one of said gears near one end and extending substantially the entire length between supporting bearings therefor whereby said intermediate shafts are strengthened against bending while permitting maximum torsional displacement.

5. A power transmission unit comprising in combination, a casing, a driving shaft, a driven shaft in alinement therewith, intermediate shafts symmetrically disposed relative to said driving and driven shafts, intermeshing gears on said shaft, and sleeves respectively keyed at one end to said intermediate shafts and to gears thereon and extending substantially the entire length between supporting bearings therefor whereby said intermediate shafts are strengthened against bending while permitting maximum torsional displacement.

In testimony whereof, I hereunto affix my signature.

FERDINAND MILLER.